(12) United States Patent
Ono

(10) Patent No.: US 8,421,984 B2
(45) Date of Patent: Apr. 16, 2013

(54) LIQUID CRYSTAL DISPLAY DEVICE

(75) Inventor: Kikuo Ono, Mobara (JP)

(73) Assignees: Hitachi Displays, Ltd., Chiba (JP);
Panasonic Liquid Crystal Display Co., Ltd., Hyogo-ken (JP)

( * ) Notice: Subject to any disclaimer, the term of this patent is extended or adjusted under 35 U.S.C. 154(b) by 69 days.

(21) Appl. No.: 12/832,246

(22) Filed: Jul. 8, 2010

(65) Prior Publication Data

US 2011/0007250 A1    Jan. 13, 2011

(30) Foreign Application Priority Data

Jul. 9, 2009   (JP) ................................. 2009-162319

(51) Int. Cl.
*G02F 1/1335*   (2006.01)
*G02F 1/1343*   (2006.01)
*G02F 1/1339*   (2006.01)

(52) U.S. Cl.
USPC ........................... 349/155; 349/106; 349/141

(58) Field of Classification Search .................. 349/106, 349/141, 155–157
See application file for complete search history.

(56) References Cited

U.S. PATENT DOCUMENTS

| 7,248,328 | B1 | 7/2007 | Shibahara | |
| 2002/0140891 | A1* | 10/2002 | Tomioka et al. | 349/141 |
| 2006/0033877 | A1* | 2/2006 | Takagi | 349/156 |
| 2008/0068539 | A1* | 3/2008 | Kaneko et al. | 349/106 |
| 2008/0079875 | A1* | 4/2008 | Oh | 349/108 |
| 2009/0079915 | A1* | 3/2009 | Kurasawa | 349/106 |

FOREIGN PATENT DOCUMENTS

| JP | 10-068956 | 3/1998 |
| JP | 10-319409 | 12/1998 |
| JP | 2000-089213 | 3/2000 |
| JP | 2000-98422 | 4/2000 |
| JP | 2001-117103 | 4/2001 |
| JP | 2002-055335 | 2/2002 |
| JP | 2003-177429 | 6/2003 |
| JP | 2007-322474 | 12/2007 |
| JP | 2009-93147 | 4/2009 |

* cited by examiner

*Primary Examiner* — Jessica M Merlin
(74) *Attorney, Agent, or Firm* — Antonelli, Terry, Stout & Kraus, LLP.

(57) ABSTRACT

The electrode structure layer includes a transparent insulating film formed of a semiconductor oxide or a semiconductor nitride, the transparent insulating film being formed so as to separate a surface of the liquid crystal and a surface of a color filter layer facing each other; and a first transparent conductive film and a second transparent conductive film both formed of an oxide semiconductor, the first transparent conductive film and the second transparent conductive film being formed on both sides of the transparent insulating film. The color filter layer includes a first region formed of one colored layer; and a second region formed of at least two laminated colored layers. The second region has a convex portion, the convex portion being formed of the at least two laminated colored layers, and the convex portion retains a gap formed between the first substrate and a second substrate.

9 Claims, 6 Drawing Sheets

LIQUID CRYSTAL DISPLAY DEVICE

CROSS-REFERENCE TO RELATED APPLICATION

The present application claims priority from Japanese application JP 2009-162319 filed on Jul. 9, 2009, the content of which is hereby incorporated by reference into this application.

BACKGROUND OF THE INVENTION

1. Field of the Invention

The present invention relates to a liquid crystal display device.

2. Description of the Related Art

Conventionally, a liquid crystal display device includes a thin film transistor (TFT) substrate on which TFTs for driving liquid crystal is formed and a color filter substrate having a color filter formed thereon, the liquid crystal being sandwiched therebetween. Between the TFT substrate and the color filter substrate, it is required to form a gap into which the liquid crystal is filled. In order to retain the gap, a spacer is formed between the TFT substrate and the color filter substrate.

There is known a method of forming a spacer by laminating colored layers constituting the color filter, in a case where the spacer is formed on the color filter substrate (Japanese Patent Application Laid-open No. 2001-117103 (corresponding U.S. Pat. No. 7,248,328)). Further, there is known a method of forming the color filter on the TFT substrate (Japanese Patent Application Laid-Open No. 2000-98422).

When the spacer is formed of the colored layers, it is required to add a barrier layer so that pigments dispersed in the colored layers may not be dissolved in the liquid crystal. Addition of the barrier layer is required also in the case where the color filter is formed on the TFT substrate.

SUMMARY OF THE INVENTION

The present invention has an object to provide a liquid crystal display device in which materials dispersed in colored layers are prevented from being dissolved in liquid crystal without adding another member.

(1) A liquid crystal display device according to the present invention includes: a first substrate; a second substrate; liquid crystal provided between the first substrate and the second substrate; a thin film transistor formed on a surface of the first substrate facing the liquid crystal; a color filter layer including a plurality of colored layers, the color filter layer being formed between the liquid crystal and the thin film transistor; and an electrode structure layer for generating an electric field which is parallel to the first substrate for driving the liquid crystal, the electrode structure layer being formed between the liquid crystal and the color filter layer, in which: the electrode structure layer includes: a transparent insulating film formed of one of a semiconductor oxide and a semiconductor nitride, the transparent insulating film being formed so as to separate a surface of the liquid crystal and a surface of the color filter layer facing each other; and a first transparent conductive film and a second transparent conductive film both formed of an oxide semiconductor, the first transparent conductive film and the second transparent conductive film being formed on both sides of the transparent insulating film, respectively; the color filter layer includes: a first region formed of one colored layer of the plurality of colored layers; and a second region formed of at least two laminated colored layers of the plurality of colored layers; and the second region has a convex portion formed therein, the convex portion being formed of the at least two laminated colored layers, and the convex portion retains a gap formed between the first substrate and the second substrate. According to the present invention, the transparent insulating film, the first transparent conductive film, and the second transparent conductive film of the electrode structure layer may prevent the materials dispersed in the colored layers from being dissolved in the liquid crystal. Further, the transparent insulating film, the first transparent conductive film, and the second transparent conductive film are members required for driving the liquid crystal, and hence it is unnecessary to add another member.

(2) The liquid crystal display device described in Item (1) may further include a black matrix formed between the color filter layer and the thin film transistor.

(3) The liquid crystal display device described in Item (1) may further include a black matrix formed between the liquid crystal and the second substrate.

DETAILED DESCRIPTION OF THE INVENTION

Hereinafter, embodiments of the present invention are described with reference to the accompanying drawings.

First Embodiment

Figure 1:
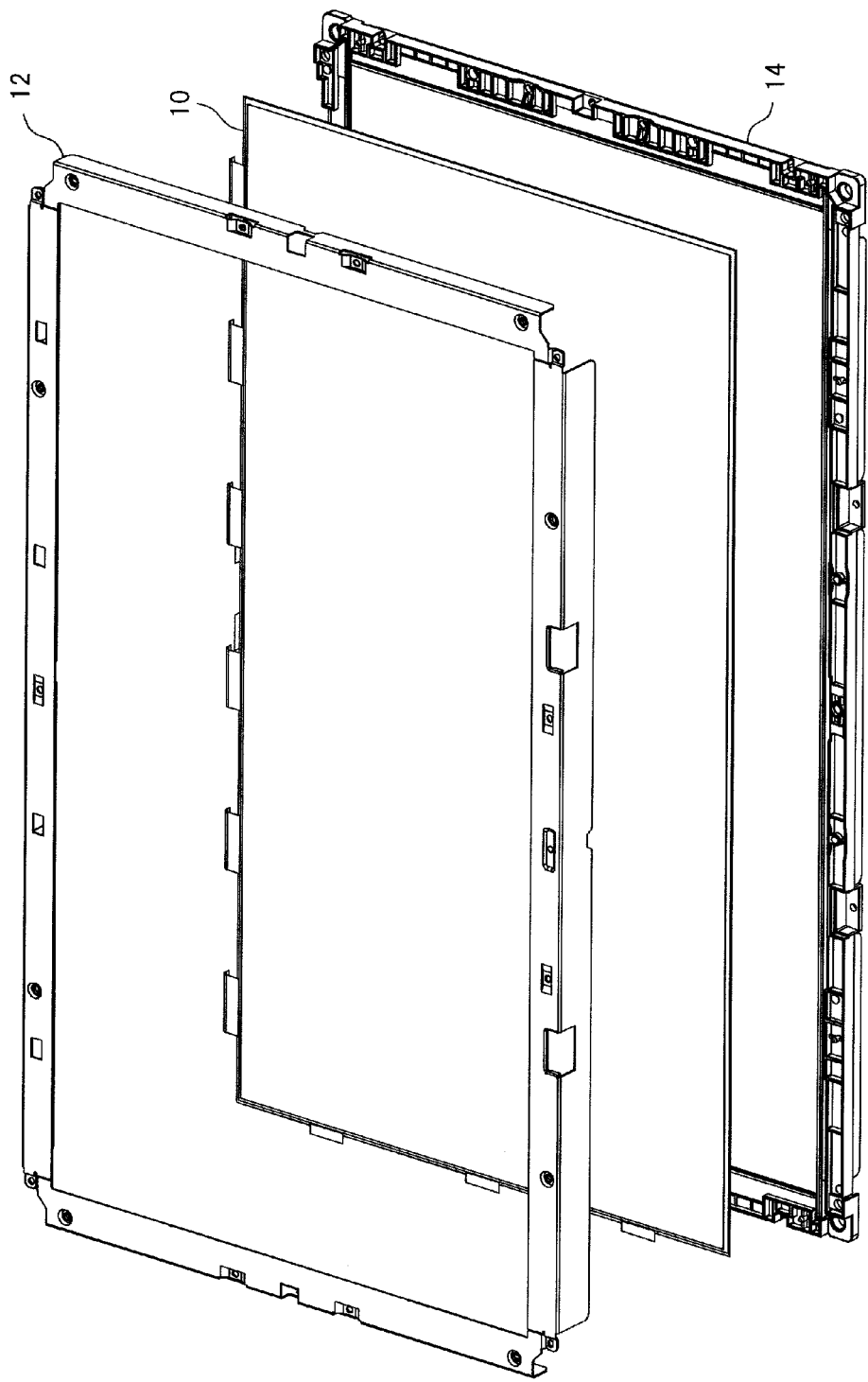
FIG. 1 is an exploded perspective view illustrating a liquid crystal display device according to a first embodiment of the present invention.

FIG. 1 is an exploded perspective view illustrating a liquid crystal display device according to a first embodiment of the present invention. The liquid crystal display device includes a liquid crystal display panel 10. The liquid crystal display panel 10 is supported by an upper frame 12 and a lower frame 14.

Figure 2:
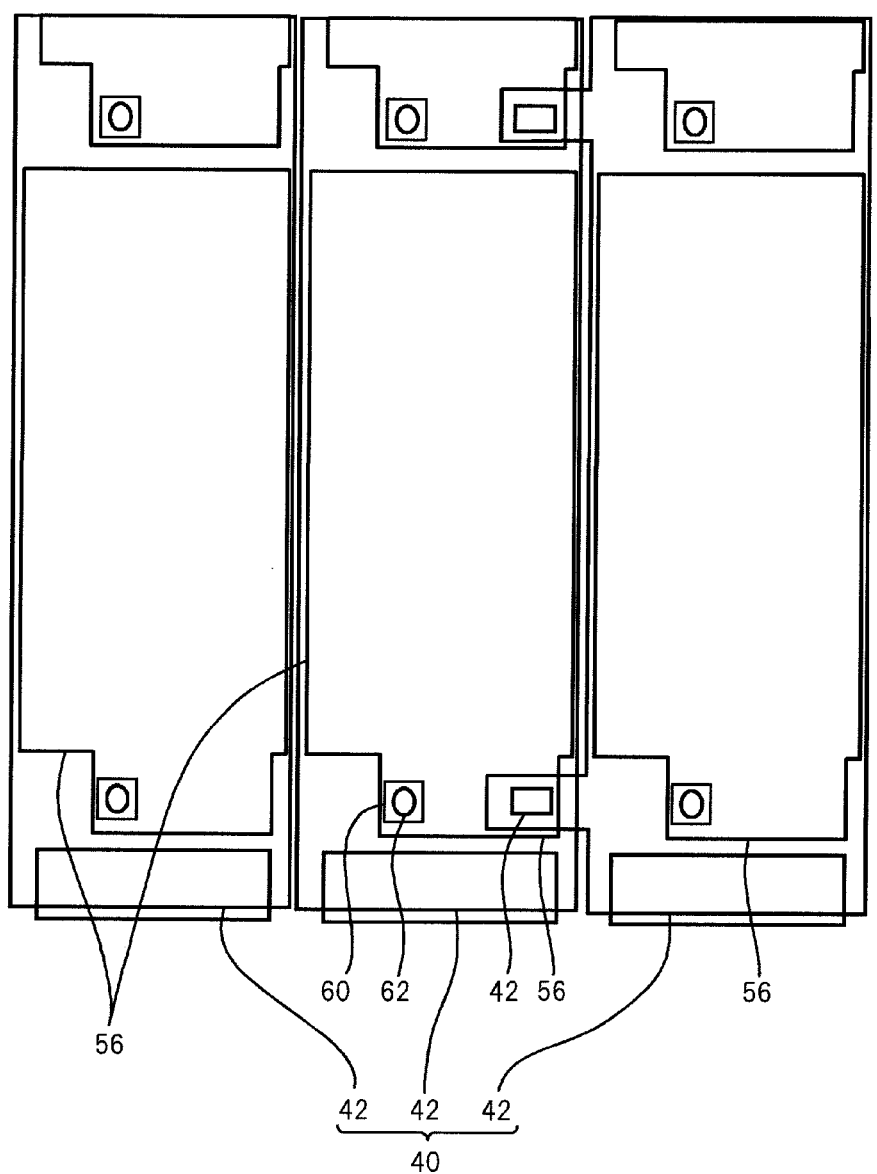
FIG. 2 is a schematic plan view illustrating a part of a liquid crystal display panel of the liquid crystal display device illustrated in FIG. 1.
Figure 3:
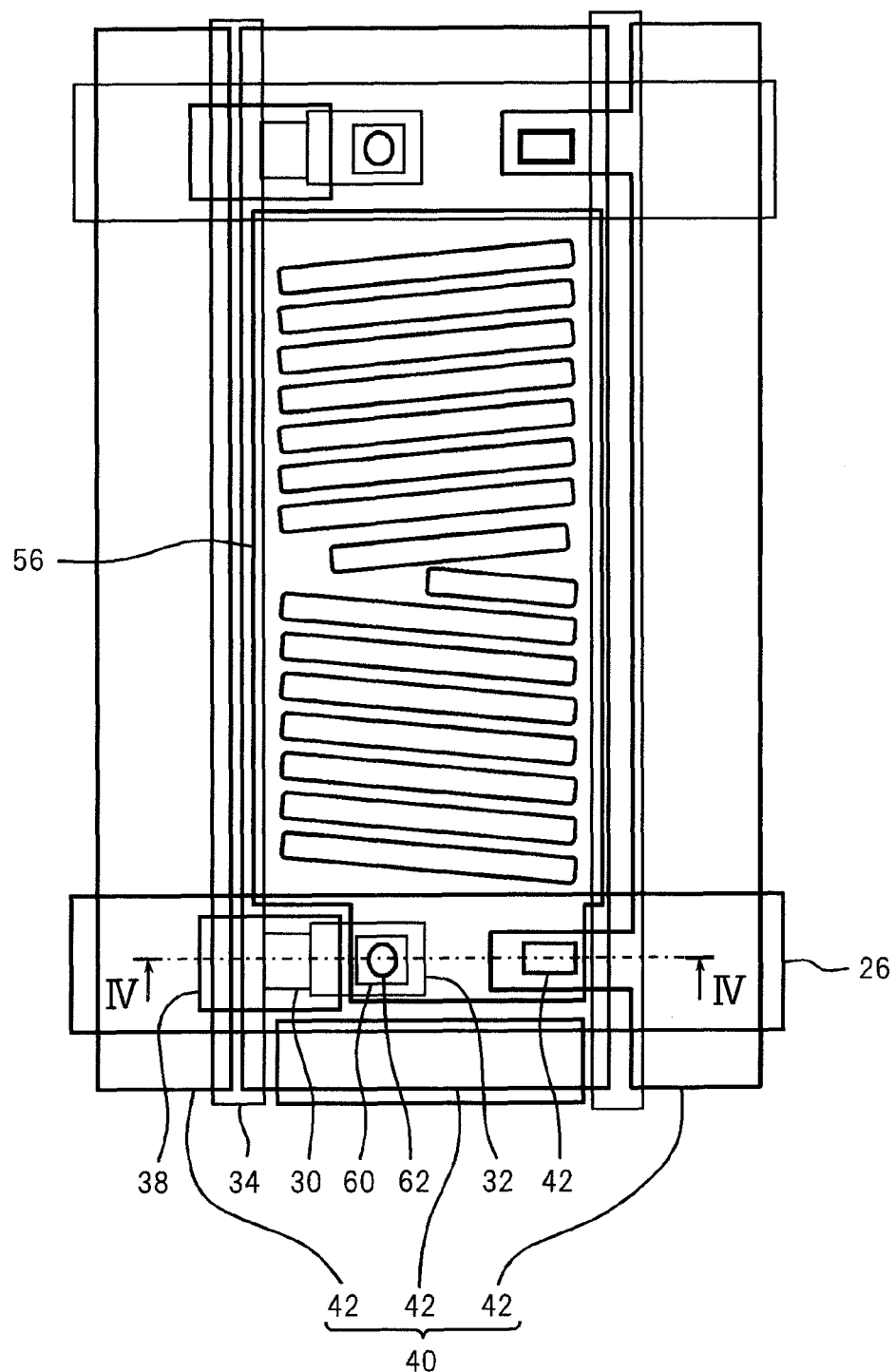
FIG. 3 is a plan view illustrating more details of the part of the liquid crystal display panel illustrated in FIG. 2.
Figure 4:
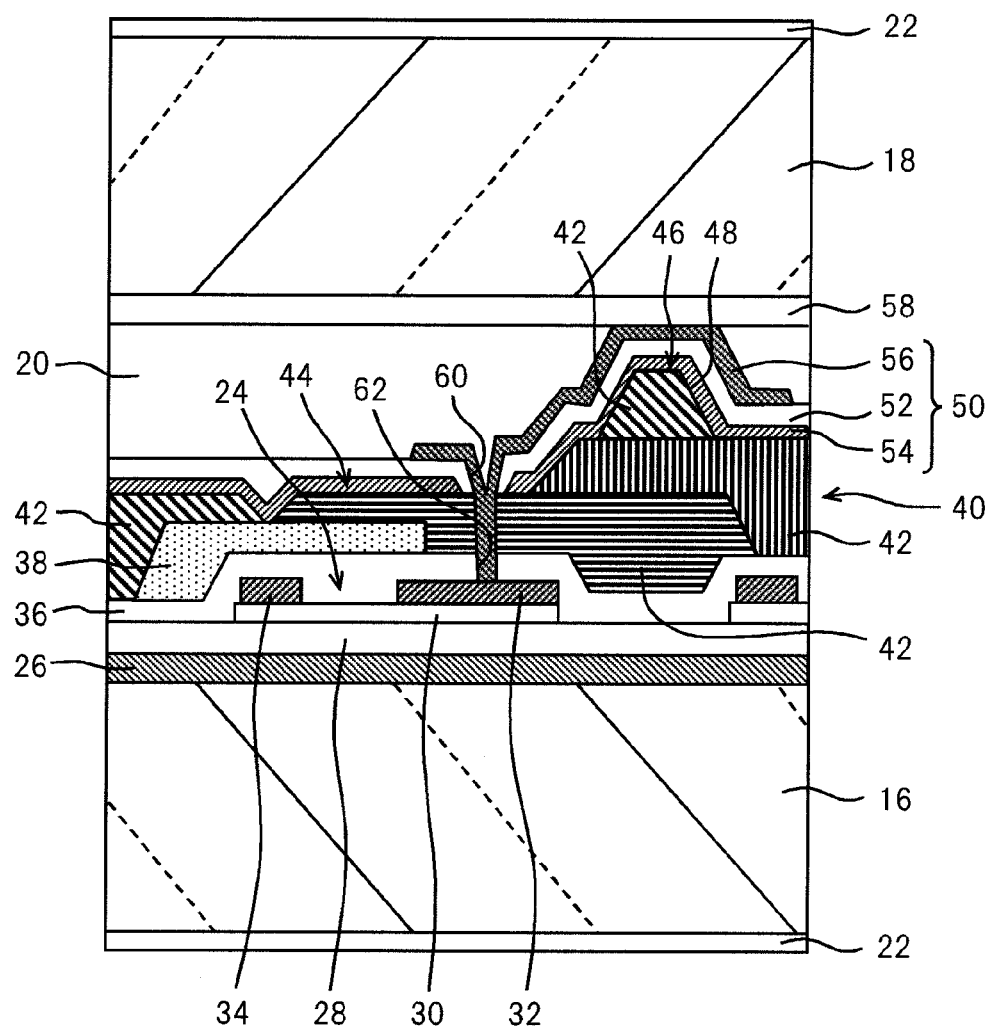
FIG. 4 is a cross-sectional view of the liquid crystal display panel taken along the line IV-IV of FIG. 3.

FIG. 2 is a schematic plan view illustrating a part of the liquid crystal display panel 10 of the liquid crystal display device illustrated in FIG. 1. FIG. 3 is a plan view illustrating more details of the part of the liquid crystal display panel 10 illustrated in FIG. 2. FIG. 4 is a cross-sectional view of the liquid crystal display panel 10 taken along the line IV-IV of FIG. 3.

The liquid crystal display panel 10 includes a first substrate 16 and a second substrate 18 (see FIG. 4). Both of the first substrate 16 and the second substrate 18 are a transparent substrate (for example, glass substrate). Liquid crystal 20 is provided between the first substrate 16 and the second substrate 18. Polarizing plates 22 are adhered to surfaces of the first substrate 16 and the second substrate 18 on sides opposite to the liquid crystal 20, respectively, in a crossed Nicols state.

A thin film transistor (TFT) 24 is formed on a surface of the first substrate 16 facing the liquid crystal 20. The thin film transistor 24 serves as a switch for controlling driving of the liquid crystal 20. The thin film transistor 24 is a bottom gate type thin film transistor, in which a gate electrode 26 is formed at a bottom thereof. A scanning voltage for control is applied to the gate electrode 26. The gate electrode 26 is formed on the first substrate 16. A gate insulating film 28 formed of an inorganic material (semiconductor oxide such as $SiO_2$ or semiconductor nitride such as SiN) is formed by, for example, plasma-enhanced chemical vapor deposition (CVD), so as to cover the gate electrode 26. A semiconductor layer 30 formed of, for example, amorphous silicon or microcrystalline silicon is formed on the gate insulating film 28. On the semiconductor layer 30, a source electrode 32 to which a pixel potential is output and a drain electrode 34 to which an image signal is applied are formed. An insulating layer 36 formed of an inorganic material (semiconductor oxide such as $SiO_2$ or semiconductor nitride such as SiN) is formed so as to cover the source electrode 32, the drain electrode 34, and the semiconductor layer 30. The insulating layer 36 prevents the semiconductor layer 30 from being contaminated by humidity.

A black matrix 38 is formed on an upper portion of the thin film transistor 24 (on insulating layer 36). That is, the black matrix 38 is formed between the thin film transistor 24 and a color filter layer 40. The black matrix 38 is formed of a resin containing a black pigment or carbon. The black matrix 38 prevents light from entering a channel region of the semiconductor layer 30. Therefore, the black matrix 38 has an island-like or stripe-like shape in plan view.

The color filter layer 40 is formed between the liquid crystal 20 and the thin film transistor 24 (for example, on black matrix 38 and insulating layer 36). The color filter layer 40 includes a plurality of (for example, three colors of red, green, and blue) colored layers 42. Particles (for example, pigments) which may be ionized and may dissolve in the liquid crystal 20 are dispersed in the colored layers 42.

The color filter layer 40 includes a first region 44 formed of one colored layer 42. In the color filter layer 40, the colored layers 42 having different colors are arranged adjacent to one another. In the first region 44, the color filter layer 40 executes an original function of the color filter (function of transmitting light merely of particular color).

The color filter layer 40 also includes a second region 46 formed of laminated colored layers 42 including two or more layers (three layers in FIG. 4) having different colors. In the second region 46, two colored layers 42 having different colors are arranged adjacent to each other and end portions thereof are formed so as to overlap with each other. In addition, in the example illustrated in FIG. 4, the colored layer 42 of another color is further overlapped thereon.

In the second region 46, a convex portion 48 (portion higher than portion where one colored layer 42 is provided) is formed of the laminated plurality of colored layers 42 having different colors. By the convex portion 48, a gap between the first substrate 16 and the second substrate 18 may be retained. An electrode structure layer 50 is formed between the liquid crystal 20 and the color filter layer 40. The electrode structure layer 50 generates an electric field which is parallel to the surface of the first substrate 16 by an applied voltage, so as to drive the liquid crystal 20. That is, an in-plane switching (IPS) type liquid crystal display device is employed in this embodiment.

The electrode structure layer 50 includes a transparent insulating film 52 formed of a semiconductor oxide (for example, $SiO_2$) or a semiconductor nitride (for example, SiN) by, for example, plasma CVD, so as to separate the surfaces of the liquid crystal 20 and the color filter layer 40 facing each other. The transparent insulating film 52 serves as a barrier layer, which prevents the particles (for example, pigments) dispersed in the colored layers 42 or the black matrix 38 from being dissolved in the liquid crystal 20.

The electrode structure layer 50 further includes a first transparent conductive film 54 and a second transparent conductive film 56 which are both formed of an oxide semiconductor and formed on both surfaces of the transparent insulating film 52, respectively. The first transparent conductive film 54 and the second transparent conductive film 56 may be formed of indium tin oxide (ITO) or indium zinc oxide by, for example, sputtering. Further, the first transparent conductive film 54 and the second transparent conductive film 56 may be formed of a plurality of layers.

A lateral electric field is generated by the voltage applied between the first transparent conductive film 54 and the second transparent conductive film 56. For example, the first transparent conductive film 54 constitutes a common electrode and the second transparent conductive film 56 constitutes a pixel electrode. Further, the first transparent conductive film 54 and the second transparent conductive film 56 serve as a barrier layer together with the transparent insulating film 52 and prevent the particles (for example, pigments) dispersed in the colored layers 42 or the black matrix 38 from being dissolved in the liquid crystal 20.

Note that, on the surface of the second substrate 18 facing the liquid crystal 20, an overcoat film 58 is formed, which is formed of an organic material and covers flaws generated on the surface of the second substrate 18. The overcoat film 58 does not include a contamination source which may be ionized and may dissolve in the liquid crystal 20 such as a pigment, and is formed of a transparent material.

According to this embodiment, the transparent insulating film 52, the first transparent conductive film 54, and the second transparent conductive film 56 of the electrode structure layer 50 may prevent the materials dispersed in the colored layers 42 from being dissolved in the liquid crystal 20. Therefore, changes in conductivity and dielectric constant due to contaminated liquid crystal 20 do not occur. Further, the transparent insulating film 52, the first transparent conductive film 54, and the second transparent conductive film 56 are members originally necessary for driving the liquid crystal 20, and hence it is unnecessary to add another member.

The electrode structure layer 50 covers the entire color filter layer 40. In a portion where the electrode structure layer 50 covers the second region 46 (laminated colored layers 42 having different colors) of the color filter layer 40, the transparent insulating film 52, the first transparent conductive film 54, and the second transparent conductive film 56 are formed continuously.

In a portion where the electrode structure layer 50 covers the first region 44 of the color filter layer 40, a first through hole 60 is formed in communication with the first transparent conductive film 54 and the transparent insulating film 52. Further, a second through hole 62 is formed in communication with the colored layer 42 formed of one layer and the insulating layer 36. The first through hole 60 and the second through hole 62 are in communication with each other. Apart of the second transparent conductive film 56 enters the first through hole 60 and the second through hole 62, to thereby be electrically connected to the source electrode 32. Further, as illustrated in FIG. 4, a notch, a slit, or a hole may be formed also in the second transparent conductive film 56 if needed. Above the color filter layer 40 in the first region 44, the transparent insulating film 52 is always present. However, the electrode structure layer 50 has a portion without at least one of the first transparent conductive film 54 and the transparent insulating film 52.

This embodiment further includes well-known structures of the liquid crystal display device (for example, alignment film), but a detailed description thereof is omitted herein.

Second Embodiment

Figure 5:
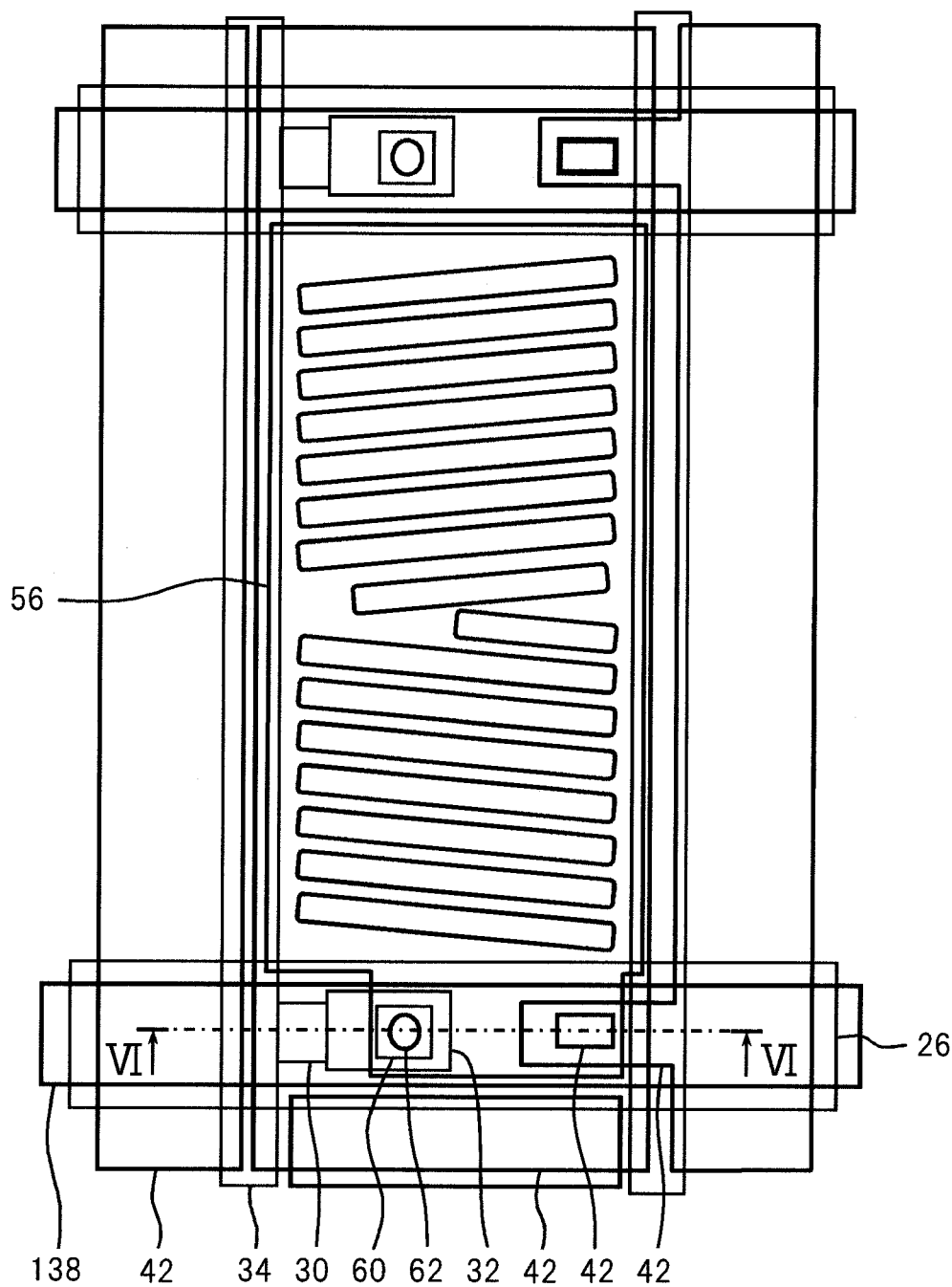
FIG. 5 is a plan view illustrating a part of a liquid crystal display panel of a liquid crystal display device according to a second embodiment of the present invention.
Figure 6:
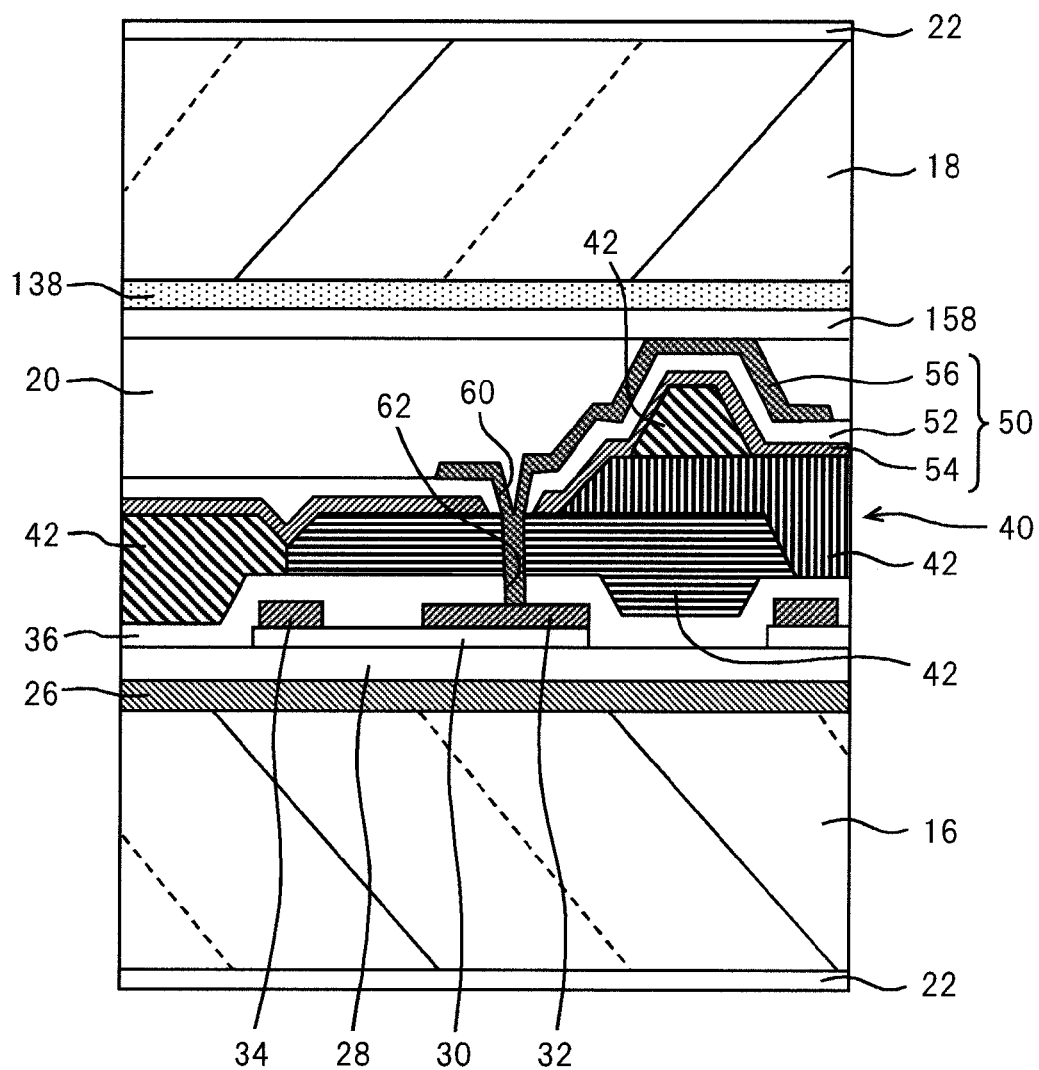
FIG. 6 is a cross-sectional view of the liquid crystal display panel taken along the line VI-VI of FIG. 5.

FIG. 5 is a plan view illustrating a part of a liquid crystal display panel of a liquid crystal display device according to a second embodiment of the present invention. FIG. 6 is a cross-sectional view of the liquid crystal display panel taken along the line VI-VI of FIG. 5.

This embodiment differs from the first embodiment in that a black matrix 138 is formed between the liquid crystal 20 and the second substrate 18 (specifically, between liquid crystal 20 and overcoat film 158). The black matrix 138 also contains a pigment (for example, carbon), and the overcoat film 158 prevents the pigment from being dissolved in the liquid crystal 20. Other details of this embodiment correspond to the contents described in the first embodiment.

The present invention is not limited to the embodiments described above, and various modifications may be made thereto. For example, the structures described in the embodiments may be replaced by substantially the same structure, a structure having the same action and effect, and a structure which may achieve the same object.

What is claimed is:

1. A liquid crystal display device, comprising:
a first substrate;
a second substrate;
liquid crystal provided between the first substrate and the second substrate;
a thin film transistor formed on a surface of the first substrate facing the liquid crystal;
a color filter layer comprising a plurality of colored layers, the color filter layer being formed between the liquid crystal and the thin film transistor; and
an electrode structure layer for generating an electric field which is parallel to the first substrate for driving the liquid crystal, the electrode structure layer being formed between the liquid crystal and the color filter layer, wherein:
the electrode structure layer comprises:
a transparent insulating film formed of one of a semiconductor oxide and a semiconductor nitride, the transparent insulating film being formed so as to separate a surface of the liquid crystal and a surface of the color filter layer facing each other; and
a first transparent conductive film and a second transparent conductive film both formed of an oxide semiconductor, and an arrangement of the first transparent conductive film and the second transparent conductive film with respect to the transparent insulating film so that the first and second transparent conductive films are formed on opposite sides of the transparent insulating film, respectively;
the color filter layer includes:
a first region formed of one colored layer of the plurality of different colored layers; and
a second region formed of at least two laminated different colored layers of the plurality of different colored layers; and
the second region has a convex portion formed therein, the convex portion being formed of the at least two laminated colored layers, and the convex portion retains a gap formed between the first substrate and the second substrate;
wherein the arrangement of the first transparent conductive film, the transparent insulating film and the second transparent conductive film is disposed between the liquid crystal and an upper surface of the color filter layer in the vertical direction; and
wherein the first transparent conductive film covers the upper surface of the color filter layer in both of the first region and the second region.

2. The liquid crystal display device according to claim 1, further comprising a black matrix formed between the color filter layer and the thin film transistor.

3. The liquid crystal display device according to claim 1, further comprising a black matrix formed between the liquid crystal and the second substrate.

4. The liquid crystal display device according to claim 1, wherein:
the semiconductor oxide comprises $SiO_2$;
the semiconductor nitride comprises SiN; and
the oxide semiconductor comprises one of indium tin oxide and indium zinc oxide.

5. The liquid crystal display device according to claim 1, wherein the electrode structure layer covers an entirety of the color filter layer.

6. The liquid crystal display device according to claim 5, wherein, in a portion where the electrode structure layer covers the second region of the color filter layer, the transparent insulating film, the first transparent conductive film, and the second transparent conductive film are formed continuously.

7. The liquid crystal display device according to claim 5, wherein:
in a portion where the electrode structure layer covers the first region of the color filter, layer, the electrode structure layer includes a first through hole formed in communication with the first transparent conductive film and the transparent insulating film; and
a part of the second transparent conductive film enters the first through hole.

8. The liquid crystal display device according to claim 5, wherein although the transparent insulating film is present above the color filter layer in the first region, the electrode structure layer has a portion without at least one of the first transparent conductive film and the transparent insulating film.

9. The liquid crystal display device according to claim 1, wherein the second transparent conductive film has any one of a notch, a slit, and a hole formed therein.

* * * * *